United States Patent [19]
Pedrizetti et al.

[11] Patent Number: 6,151,708
[45] Date of Patent: Nov. 21, 2000

[54] DETERMINING PROGRAM UPDATE AVAILABILITY VIA SET INTERSECTION OVER A SUB-OPTICAL PATHWAY

[75] Inventors: Raymond D. Pedrizetti; Scott D. Quinn, both of Issaquah; Timothy W. Bragg, Redmond, all of Wash.

[73] Assignee: Microsoft Corporation, Redmond, Wash.

[21] Appl. No.: 08/994,594

[22] Filed: Dec. 19, 1997

[51] Int. Cl.[7] .................................................. G06F 9/45
[52] U.S. Cl. .................................. 717/11; 717/10; 717/12
[58] Field of Search ..................................... 395/705, 706, 395/707, 712, 709; 711/184; 382/166; 707/8; 709/221, 217; 717/11

[56] References Cited

U.S. PATENT DOCUMENTS

| | | | |
|---|---|---|---|
| 4,999,806 | 3/1991 | Chernow et al. | 717/11 |
| 5,339,430 | 8/1994 | Lundin et al. | 709/332 |
| 5,586,304 | 12/1996 | Stupek, Jr. et al. | 395/712 |
| 5,701,463 | 12/1997 | Malcolm | 707/10 |
| 5,701,491 | 12/1997 | Dunn et al. | 717/11 |
| 5,742,829 | 4/1998 | Davis et al. | 395/712 |
| 5,752,042 | 5/1998 | Cole et al. | 395/712 |
| 5,832,275 | 11/1998 | Olds | 395/712 |
| 5,832,484 | 11/1998 | Sankaran et al. | 707/8 |
| 5,881,236 | 3/1999 | Dickey | 709/221 |
| 5,919,247 | 7/1999 | Van Hoff et al. | 709/217 |
| 5,930,513 | 7/1999 | Taylor | 717/11 |
| 6,047,129 | 4/2000 | Frye | 717/11 |
| 6,049,671 | 4/2000 | Slivka et al. | 717/11 |

OTHER PUBLICATIONS

Karger et al., Consistent hashing and random trees: distributed caching protocols for relieving hot spots on WWW, ACM STOC, pp 654–663, 1997.

Wuytack et al., Tranforming set data types to power optimal data structure, ACM pp 1–6, 1997.

Wall, Matthew, "User services implications for client server transitions", ACM SIGUCCS XX, pp 231–238, Jan. 1992.

Alok Sinha, "Client Server Computing", Comm. of the ACM, vol. 35, No. 7, pp 77–98, Jul. 1992.

Felton et al., "Early experience with message passing on the SHRIMP multicomputer", ISCA ACM, pp 296–307, Mar. 1996.

(List continued on next page.)

*Primary Examiner*—Paul R. Lintz
*Assistant Examiner*—Anil Khatri
*Attorney, Agent, or Firm*—Klarquist Sparkman Campbell Leigh & Whinston, LLP

[57] ABSTRACT

A set of software programs on a client computer is compared against a set of updates on a server computer to determine which updates are applicable and should be transferred from the server to the client. If the link between the client and server is slow, the listing of available updates must be represented in compact form. A many-to-one mapping function (e.g. a hash function) is applied to update identifiers to generate a table of single bit entries indicating the presence of particular updates on the server. This table is transferred to the client over the slow link. At the client, the same mapping function is applied to program identifiers, and corresponding entries of the transferred table are checked to determine whether the server has a potential update. If such a potential update is noted, a second transmission is requested by the client from the server—this one conveying additional data by which hash collisions can be identified by the client and disregarded. If availability of an actual update (versus a hash collision) is thereby confirmed, the client requests a third transmission from the server—this one conveying the actual update data. By this arrangement, optimized use is made of the low bandwidth link, with successively more information transferred as the likelihood of an applicable update is successively increased. (The same arrangement can be employed in reverse, with the bit table generated at the client and identifying program files available for possible updating, transferred to the server, etc.).

22 Claims, 13 Drawing Sheets

OTHER PUBLICATIONS

Naps et al., "Using the WWW as the delivery mechanism for interactive, visualization based instructional modules", ACM ITiCSE, pp 13–26, 1997.

Franklin et al., "Tranactional client server cache consistency: alternative and performance", ACM Trans. on Database sys. vol. 22, No. 3, pp 315–363, Sep. 1997.

Browne et al, "Location independent naming for virtual distributed software respositories", ACM SSR, pp 179–185, Jan. 1995.

Dwarkadas et al, "Evaluation of release consistent software distributed shared memory on emerging network technology", IEEE, pp 144–155, 1993.

Iftode et al, "Share virtual memory with automatic update support", ICS ACM, pp 175–183, 1999.

FIG. 3 -- Step 212 of FIG. 2

FIG. 8

```
                                                               812
800                                                           /
    ◄
    unsigned long Rand(unsigned long seed)
    {                                    ___ 814
        unsigned long r = 2836L;         ___ 816
        unsigned long a = 16807L;        ___ 818
        unsigned long n = 127773L;       ___ 820
        unsigned long d = 2147483647;
        unsigned long val;  ___ 822
                                            ___ 824
        val = ((seed%n)*a)-(seed/n)*r ;
        if(((long)val) <= 0)
            val = val + d;
        return(val);
    }
802                                                    804
                                                      /
                                                     806
    ◄                                               /
    unsigned long Hash( const char *IDstring,
                       unsigned long tablesize)
    {
810 ___ unsigned long hash = 1;
        while(*IDstring)            ___ 808
        {
            hash = hash + Rand(hash+toupper(*IDstring));
            ++IDstring;
        }
        hash = hash%tablesize;
        return(hash);
    }
```

DETERMINING PROGRAM UPDATE AVAILABILITY VIA SET INTERSECTION OVER A SUB-OPTICAL PATHWAY

FIELD OF THE INVENTION

The present invention relates to identifying a file or set of files sharing a particular characteristic, and in particular, identifying such files while minimizing data transfer over a low-bandwidth communications pathway.

BACKGROUND AND SUMMARY OF THE INVENTION

The prior art is replete with various schemes for providing data-file updates over a network connection. Ever since the days of large centralized corporate mainframes, maintaining software has been a pressing concern. With the proliferation of fast and powerful workstations, maintaining current software has become even more complex. Recently, software maintenance has been somewhat automated by the creation of automatic computer software updates programs such as "Oil Change" by CyberMedia.

There is a fundamental problem, however, with present-day automatic update schemes. With the explosion in program size, where a single complex application may have hundreds or thousands of program modules, one ends up with a prohibitively large data-file listing all files and associated version tracking information for all application program modules being tracked by a server. (For the purposes of this application, the term "server" refers to the entity or entities providing the updating service, and the term "client" refers to the computer or organization receiving updated files.) In order for a client to determine whether there are program updates available, a potentially huge volume of data has to be transferred between client and server. If the client only has a low-bandwidth connection to the server, such coordination can be very time consuming.

In accordance with a preferred embodiment of the invention, the foregoing and other disadvantages of the prior art are overcome.

In the preferred embodiment, a set of software programs on the client computer is compared against a set of updates on the server computer to determine which updates are applicable and should be transferred from the server to the client. A many-to-one mapping function (e.g. a hash function) is applied to update identifiers to generate a table of single bit entries indicating the presence of particular updates on the server. This table is transferred to the client over the slow link. At the client, the same mapping function is applied to program identifiers, and corresponding entries of the transferred table are checked to determine whether the server has a potential update. If such a potential update is noted, a second transmission is requested by the client from the server—this one conveying additional data by which hash collisions can be identified by the client and disregarded. If availability of an actual update (versus a hash collision) is thereby confirmed, the client requests a third transmission from the server—this one conveying the actual update data. By this arrangement, optimized use is made of the low bandwidth link, with successively more information transferred as the likelihood of an applicable update is successively increased. (The same arrangement can be employed in reverse, with the bit table generated at the client and identifying program files available for possible updating, transferred to the server, etc.)

The foregoing and other features and advantages will be more readily apparent from the following detailed description, which proceeds with reference to the accompanying drawings.

BRIEF DESCRIPTION OF THE DRAWINGS

FIG. 8 shows code fragments for a preferred method of hash encoding identifiers.

DETAILED DESCRIPTION OF PREFERRED EMBODIMENTS

Preferred embodiments use computer systems to implement a method and apparatus embodying the invention. Such computer systems includes as their basic elements a computer, an input device, and output device. The computer generally includes a central processing unit (CPU), and a memory system communicating through a bus structure. The CPU includes an arithmetic logic unit (ALU) for performing computations, registers for temporary storage of data and instructions, and a control unit for controlling the operation of computer system in response to instructions from a computer program such as an application or an operating system.

The memory system generally includes high-speed main memory in the form of random access memory (RAM) and read only memory (ROM) semiconductor devices, and secondary storage in the form of floppy disks, hard disks, tape, CD-ROM, etc. and other devices that use optical or magnetic recording material. Main memory stores programs, such as a computer's operating system and currently running application programs, and also includes video display memory. The input and output devices are typically peripheral devices connected by the bus structure to the computer. An input device may be a keyboard, modem, pointing device, pen, or other device for providing input data to the computer. An output device may be a display device, printer, sound device or other device for providing output data from the computer. It should be understood that these are illustrative elements of a basic computer system, and are not intended to a specific architecture for a computer system.

Figure 1:
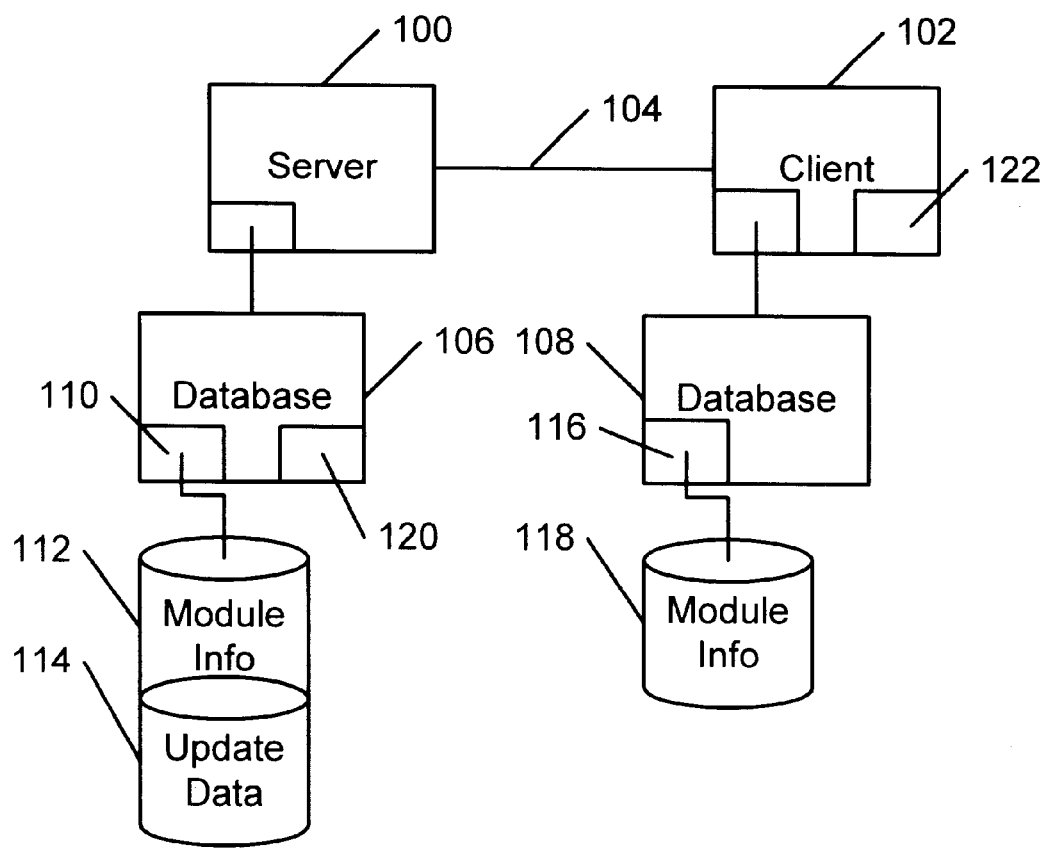
FIG. 1 shows a client and server configured according to a preferred embodiment of the invention.

FIG. 1 shows the basic configuration of a client and server employed in an illustrative embodiment of the present invention. A server computer 100 is in communication with a client computer 102 over a communications pathway 104. It is expected that pathway 104 is a low bandwidth connection (e.g. 56 Kbit/sec) provided by a device such as a computer modem or the like. In addition, communications between the client and server may be through an Internet connection via a Web Browser, and as such, available bandwidth of pathway 104 is further reduced by inherent Internet-related overhead.

Associated with both the server 100 and client 102 are databases 106, 108, containing information regarding program modules that may be updated. Client computer 102 may initially have the database installed during production of the computer, and then later updated as needed, or the client computer may dynamically download its initial copy of its database 108.

On the server 100 side, database 106 contains entries 110 regarding each updateable program module, where each entry contains data 112 including the module name and related tracking information. Associated with each entry 110 is update data 114 corresponding to the data required to bring the particular entry up to date with respect to the latest version of that module. In a preferred embodiment, each older module version (e.g. a first, second, and third version of a module) has its own database entry and associated update data to bring such module up to date. It is understood, however, that such multiple older modules may be grouped under a single entry, and the update data appropriately segmented for access by client 102.

On the client 102 side, database 108 corresponds to the server database 106 in that it also contains entries 116 regarding each updateable program module, where each entry contains data 118 including the module name and related tracking information. However, unlike its server counterpart, the client preferably does not maintain update data for each module entry 116. In addition, the client computer database 108 might only track entries for program modules corresponding to programs 122 already installed on client computer 102.

Consequently, in a preferred embodiment, the server database 106 may contain entries 120 not found in the client's copy 108 of the database. As noted above, since the client may or may not have had an initial database installed when the computer was manufactured, a preferred embodiment obtains or updates a client database copy. In one embodiment, the client seeks to have an identical copy of the server database; in an alternate embodiment, the client only maintains a database corresponding to programs already installed in the client's computer. Both of these embodiments are described further below. Preferably the database is designed so that the client version 106 can be incrementally revised.

Figure 2:
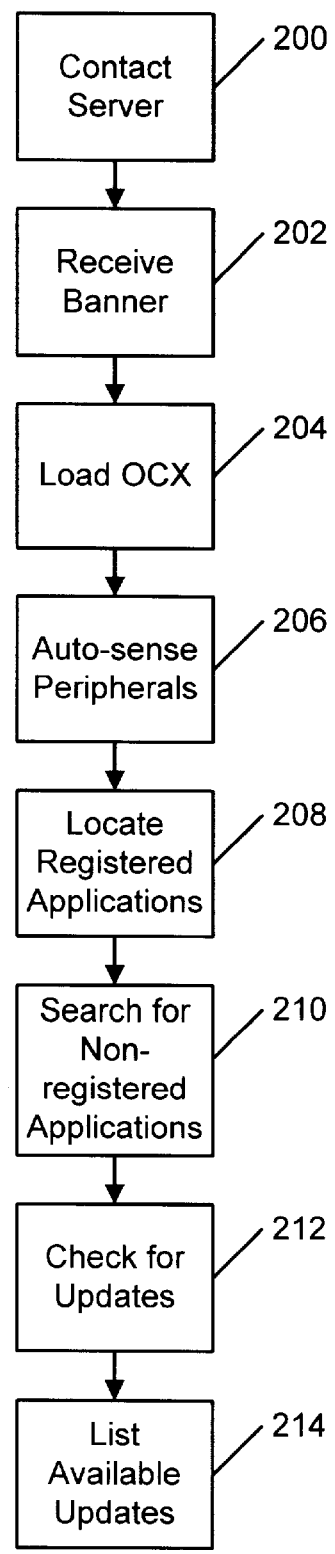
FIG. 2 is a flow-chart showing a client checking for an update.

FIG. 2 is a flow-chart showing a client checking for the availability of module updates. (For the purposes of this application, it is assumed that a dedicated server is available to field such incoming client requests.) The first step 200 taken by a requesting client is to contact a server. In response, at step 202 the server transmits a banner page to the client. This banner page may contain information to be displayed by a client, such as advertisements, or it may be data which is simply absorbed by the contacting client, where such data may include information regarding the latest version of the automatic upgrade system itself. A third alternative would be to combine these two possibilities, so as to provide visual feedback to a client user while also allowing the upgrade system to ensure that the contacting client's software and database are not too out of date.

The next step 204 is to load the client's OLE (object linking and embedding) Custom Control (hereinafter OCX). As described more fully below, the function of the OCX is to contact the server computer and coordinate upgrading components installed in the client's computer. In another embodiment (e.g. push environments), the client OCX loading may be controlled by commands received from the server. (A push environment is considered to be one in which a source external to a client asynchronously sends information to the client, and the client is configured to automatically receive (and perhaps process) the pushed data.)

After the client OCX is loaded, the next task is to assemble a master list of identifiers, these identifiers being uniquely assigned for each hardware or software module that may be upgraded. At step 206, identifiers are collected for all auto-sense equipment installed in the client computer. In a preferred embodiment, auto-sense equipment includes all equipment conforming to the Plug-and-Play (hereinafter PnP) specification promulgated by Microsoft Corporation for its Microsoft Windows environments, as well as other architectures in which it is possible to query or read a device's unique identifier.

Similarly, at step 208, identifiers for software installed in the client computer are collected. Preferably, such identifiers are ascertainable from a review of the installation of smart applications, where such smart applications register themselves into the Windows Registry file or create some other data file containing an installation log. The Registry or log contains the unique identifier for the installed program, which is then included into the master list.

At step 210, the illustrated embodiment may also allow a search to be performed for other hardware or software not already found in the foregoing steps. For software, such further searching may be across all directories in the client computer, or only within predetermined designated directories (e.g. c:\windows and c:\windows\system). For the located files, in one embodiment a search is made through the client database (item 108 of FIG. 1), and if the file is located, then the identifier found in the database is used for the located file. In another embodiment, a pre-determined scheme is used to generate a corresponding file identifier (e.g. a hash function based on the file name, date, size and creator). Each such identifier is added to the client's master list.

At step 212, after the master list of identifiers is built, a check is performed to determine whether corresponding program updates exist at the server. The details of step 212 are shown as FIG. 3.

At step 214, a list is presented to a user indicating what updates are available. At this point the user may select which updates to perform to the client computer. Alternatively, rules may be established for the automatic processing of available updates.

Figure 3:
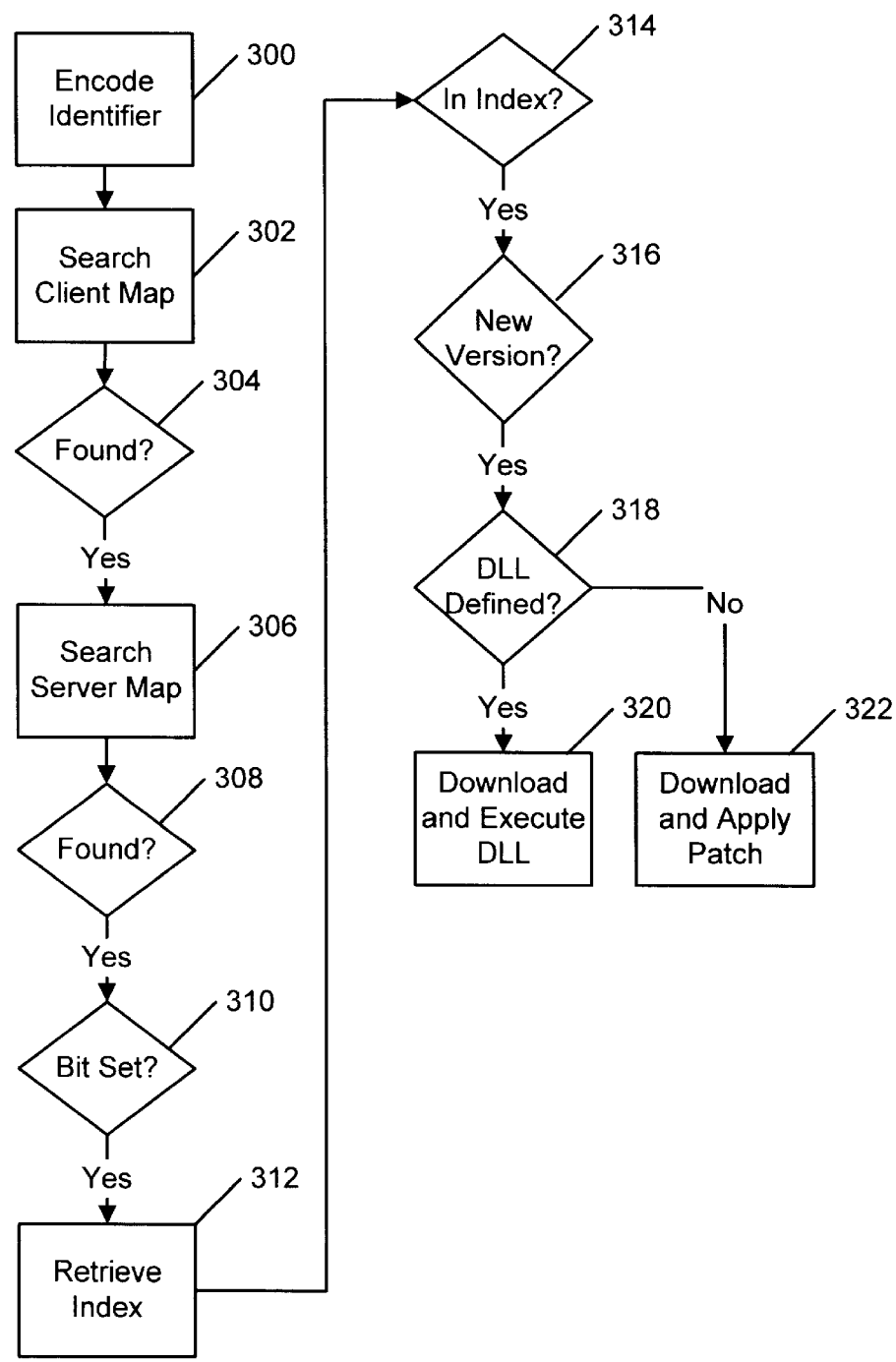
FIG. 3 is a detailed view of a step of FIG. 2.

FIG. 3 shows the steps taken by the client to evaluate whether there is an update available on the server for items in the client's master list.

Since the client's update evaluation potentially requires checking a huge number of files for available updates, it would be prohibitive to have the client and server pass file name (or other program or hardware module references) back and forth to determine the availability of upgrades. Instead, as discussed below, the server maintains a large bit field having bit entries which indicate the potential availability of updates. This bit field is compressed and transferred to the client, allowing the client to locally determine a correspondence between the client's list and the server's bit field. The correspondence between modules and upgrades is by a hash function which maps unique module references to index positions within the field (a hash table).

In a preferred embodiment, after transfer to the client, the bit field is decompressed, as needed, into a sparse hash table (bit field) by the client OCX. Various schemes may be employed regarding scheduling the transfer of the bit field, such as getting a new copy every time an Internet connection is made, but at a minimum a current copy is retrieved at the initiation of the upgrade procedure.

Each sparse table's hash value has a corresponding entry in a large bitmap hash table stored on the server. (Note that although this specification presumes that a master list is created before searching for any updates, in an alternate embodiment, testing for updates may be made sequentially as identifiers are located, or testing may be done via a parallel algorithm.) For simplicity and clarity, a preferred embodiment creates the master list first. The procedure for updating the files is as follows.

In order to check the update status for a given file or hardware component, at step 300 the OCX encodes the file's or device's unique identifier according to the hash function so as to obtain its hash number (a non-unique identifier). At step 302, the local sparse table is indexed by this hash number to identify a single bit position. If the bit is set (step 304), this indicates that an update may exist for the file or device on the server. The reason the result is inconclusive is due to possible hash table collisions. More than one unique identifier can encode into a single hash number, resulting in a one to many correspondence between hash values and unique identifiers. It is not certain that an update on the server, if present, corresponds to the present file or device for which an update is being checked.

Embodiments may be also configured to catch synchronization errors between the client and server, where, after locating the set bit in the local table, at step 306, the corresponding bit is located 308 in the hash table on the server, and checked 310 to ensure it is also set.

Figure 4:
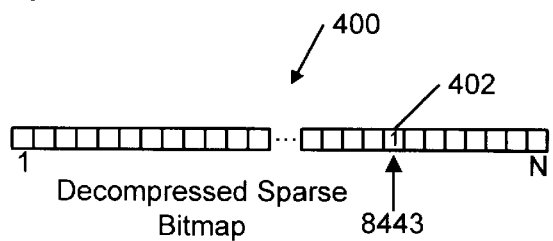
FIG. 4 shows one preferred embodiment for a hash table entry.

Digressing for a moment, FIG. 4 shows one possible embodiment for a table entry in the a hash table 400 stored on the client and the server. Recall that the client's local sparse hash table simply contains a list of "1" (high) or "0" (low) bits in certain table locations, and that the server contains a corresponding table of bit entries, some of which have associated update data. Each position in the table 400 corresponds to a different hash value. For example, shown is a bit 402 set high (e.g. equal to 1) indicating an update is available for some component that hashes to value 8443. Thus the possible availability of an update for a software or hardware component is indicated by a single bit transmitted in the bitmap table sent to the client computer. When the flag is set high, there is an available update, and by convention a file is present on the server having the name of "index.<hash id>". (For example, if the hash id is 8443, then the index file would be "index.8443".) This file contains entries for all files or devices, having the present hash id 402, for which an update is available.

Returning now to FIG. 3, after addressing the table with the hash value, the bit at that entry (the "flag" bit) is examined to determine if it is set (step 310). If set, then at step 312 the associated index file corresponding to the hash number is retrieved from the server. This index file lists all files or devices having that particular hash number, as well as other information related to the file or device, such information including a PnP id, version number, file date, optional override DLL (Dynamic linked Library), and name of the update package. In a preferred embodiment, the index file information is used to determine if the server database (item 106 of FIG. 1) contains an update for the file or hardware component being checked, or whether a hash collision occurred (i.e. an update is available for a different program module that yields the same hash code). Note that for the purposes of this specification and claims that follow, references to an update for a hardware component includes not only updated drivers for the device, but also any software for re-programming programmable portions of the device (e.g. PRAM, PROM, E-PROM, etc.).

At step 314, a comparison is made between the unique identifier of the client file or device in question and the entries in the index file obtained from the server. If a match is found, then at step 316, version information is compared to confirm that the server has new update for the file or device. If an update exists, at step 318 the local OCX checks whether an optional download DLL is defined in the index file. If defined, then at step 320 the download DLL is downloaded from the server and executed locally on the client. Using the optional download DLL allows for writing programs specifically tailored to a specific update. For example, a vendor may write a DLL that coordinates any updates to the vendor's files and devices. If a download DLL was not defined, then at step 322, the update data is downloaded from the server and applied to the file or device being updated. Note that in alternate embodiments, the update data may be located on a third-party server, where only the location of such information is stored on the server 100 (FIG. 1).

Figure 5:
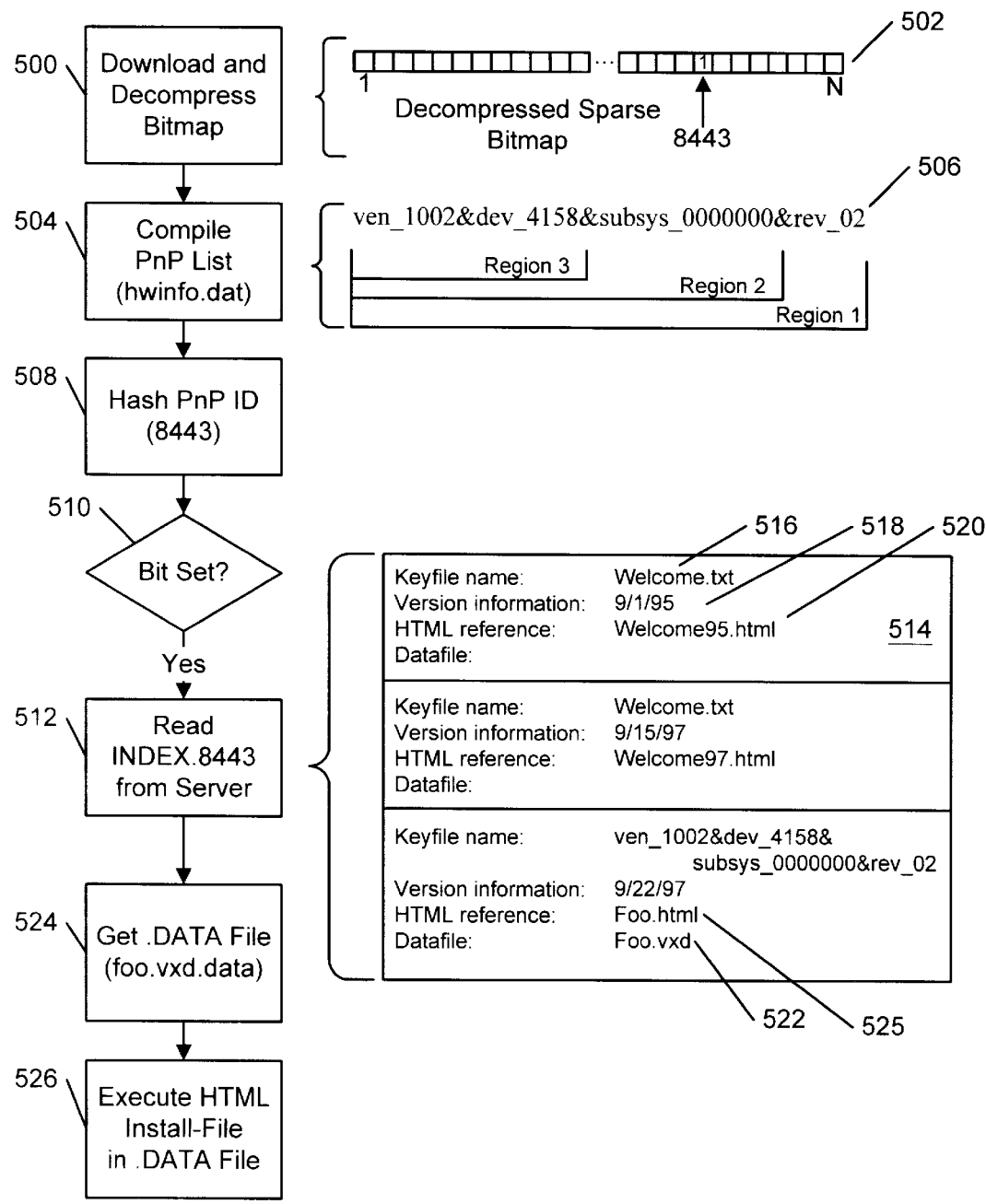
FIG. 5 is a flow-chart showing, in detail, a portion of FIG. 2.

FIG. 5 is a flow-chart showing a preferred implementation of the FIG. 2 and FIG. 3 embodiments.

In the exemplary embodiment shown in FIG. 5, the upgrade process begins at step 500 by copying a file named bitmap.bts from the server. This file is a compressed version of a sparse bitmap stored at the server. The bitmap is copied to the client machine and decompressed. Shown associated with step 500 is an N-bit decompressed sparse bitmap 502. Preferably a run length encoding scheme (e.g. RLL (Run Length Limited)) is utilized to compress this bitmap prior to transmission to the client, but other compression schemes may also be used. As discussed above, the $N^{th}$ bit entry in the field 502 corresponds to the hash value N encoding of some arbitrary (preferably unique) string, PnP identifier, file name, or other reference.

At the next step 504, a list is compiled of all PnP devices presently in the client system. Preferably a local OCX creates a list in a file named HwInfo.dat. In preferred embodiments, the OCX runs as part of a hardware download manager incorporated into the controlling operating system. In alternate embodiments where the OCX is not embedded into the operating system, the OCX may be executed via an ActiveX or equivalent control.

A similar list is also compiled for software that is eligible to receive updates. For simplicity, updating software is not shown in FIG. 5, as once an identifier is located for eligible software, the upgrade procedure is the same as for hardware. The general idea is to generate a list (or lists) containing identifier strings for upgrade candidates. A plain text file is presumed, but as the length of the list gets long, the list may be encoded as records in a database or other data structure. Note that an alternate method is to check each eligible hardware or software component as identified, without compiling a local list.

Shown associated with step 504 is an illustrative PnP identifier 506 corresponding to a PCI-bus expansion card. In the Microsoft Windows environment, the format for PnP identifiers is well known. These PnP identifiers have several regions. Shown as Region #1 is the most specific reference available, which corresponds to the entire identifier string for a given PnP device. This #1 reference indicates the manufacturer and model of the PnP device, as well as indicating that it is revision version 2 of the PnP model. Shown as Region #2 is a less specific reference, indicating the manufacturer and device type, but not the specific installed device. For example, Region #2 indicates some information regarding a core device as modified or altered by an original equipment manufacturer (OEM). Shown as Region #3 is the general manufacturer identifier. This is the least amount of information that may be encoded into an identifier. For more information, see chapter 8 of *Inside Windows* 95, by Adrian King (Microsoft Press 1994), and references cited therein.

The preferred embodiment takes advantage of this tiered structure to allow upgrades to be tailored to different levels. Presently upgrades are available to specific devices (region #1), offered generally to a class of devices (region #2), or designed as a generic upgrade applicable to all products made by a manufacturer (region #3).

The next step 508 is to hash encode each identifier string in the listing of hardware and software. Assuming PnP identifier 506, the first step is to hash encode the Region #1 (complete) identifier to see if there may be an update for this device. If not found, then the second and third regions are tested. Assume the complete identifier hash-encodes to 8443.

At step 510 the local sparse bitmap 502 is checked to determine if bit 8443 is set. As shown, bit 8443 of the bitmap 502 is set high, indicating that there may be an update for the current identifier 506.

At step 512, a data (index) file for hash value 8443 is downloaded from the server to determine whether an update is available for the current identifier. As noted, this file is named INDEX.<hash-value>. This file enables the client to determine whether there has been a hash collision, or whether an update really is available for device 506. Only if the 8443 bit is set in bit map 502 will the index file be downloaded from the server.

Shown associated with step 512 is exemplary content of INDEX.8443. Three file regions are visible, each corresponding to an upgrade available for a device having the same hash encoding value (i.e. three hash conflicts). Each region (e.g., the region 514) has three or more entries: keyfile name 516, version information 518, and HTML (Hypertext Markup Language) reference 520. The keyfile 516 lists the file name or device (preferably PnP) for which the server has an available update. The version information contains some data, such as a revision reference or file date, to allow the client to determine if its file or device is out of date. The HTML reference directs the client to an HTML page containing instructions for performing the update; this may include an ActiveX or other control embedded within the page.

A datafile 522 may also be defined. This datafile may correspond to an override DLL discussed above (see FIG. 3, step 318). In a preferred embodiment, the override DLL has a single function: it is downloaded from the server and executed locally on the client, and allows a manufacturer of a component being upgraded one last chance to accept or reject an upgrade based on the configuration of the client's machine. If the DLL returns yes, then the upgrade proceeds. Alternate embodiments may configure the DLL to do more than simply return a YES/NO response.

Note that the first two regions of INDEX.8443 represent hash conflicts because there are two updates available for files having the same file name Welcome.txt. For this example, we are assuming the simplistic approach of simply encoding a file name, without more information, in order to get its hash value. (In some embodiments, the hash value is also a function of additional data, such as file date and file size.) The point is that there may be identical identifiers since a preferred embodiment allows different file or device versions to have different upgrade strategies.

After getting the INDEX.8443 file, the client searches this file and determines that the current PnP identifier 506 has an available upgrade. (Assume the client version is old.) Since a datafile 522 has been defined for this upgrade, at step 524 a datafile named foo.vxd.data (identified in INDEX.8443) is downloaded from the server. This data file contains at least one item, a banner string to display to a user (e.g. "Update for the Foo.VXD driver"). This file may also contain the name and location of a download DLL file to get and execute locally as discussed above.

At step 526, after the download DLL (if defined) returns true, execution may continue with the HTML reference 525 defined for the current PnP device 506 being upgraded. As discussed above, the HTML reference may embed within it whatever type of ActiveX control or other software is necessary to perform the upgrade. Also, depending on the configuration of the client side, the upgrade system may instead add this upgrade to a list, and after a list of all available upgrades is compiled, then the user may be presented with a list from which to choose which upgrades to perform. In this configuration, the user sees a list of banner strings as defined for the upgrade within the appropriate data file 522.

Preferred embodiments searching through predetermined locations for file and device candidates for upgrades; a mechanism is provided for updating the search locations. This revision to the "predetermined" locations is effected by placing a file on the server named INSTALL.NEW. This file, when present, is copied from the server by the client, and it may contain instructions regarding revising search paths, or a list of new files to check for available updates, or other instructions to the client side of the download manager.

Regarding security issues, it should be noted that preferred embodiments may define the location or locations of trusted servers from which upgrades may be received. In addition, due to the ability to spoof machine identities, additional challenge/response information may be required from the server before the client accepts any data from the server. Further, it is expected that some or all of the communications between client and server may be encrypted using well known public key encryption or the like. Digital signatures may also be applied to upgrade data so as to verify the source of such data. Through utilization of proper encryption and signatures, it is extremely difficult to inject foreign data into the upgrade stream. However, for simplicity in discussing preferred embodiments, it is assumed herein that the client and server communicate over a secure communication pathway.

FIGS. 6A–6G show a preferred implementation of the user interfaces for the upgrade procedure of FIG. 5. These figures show the upgrade process from the user's perspective.

Figure 6A:
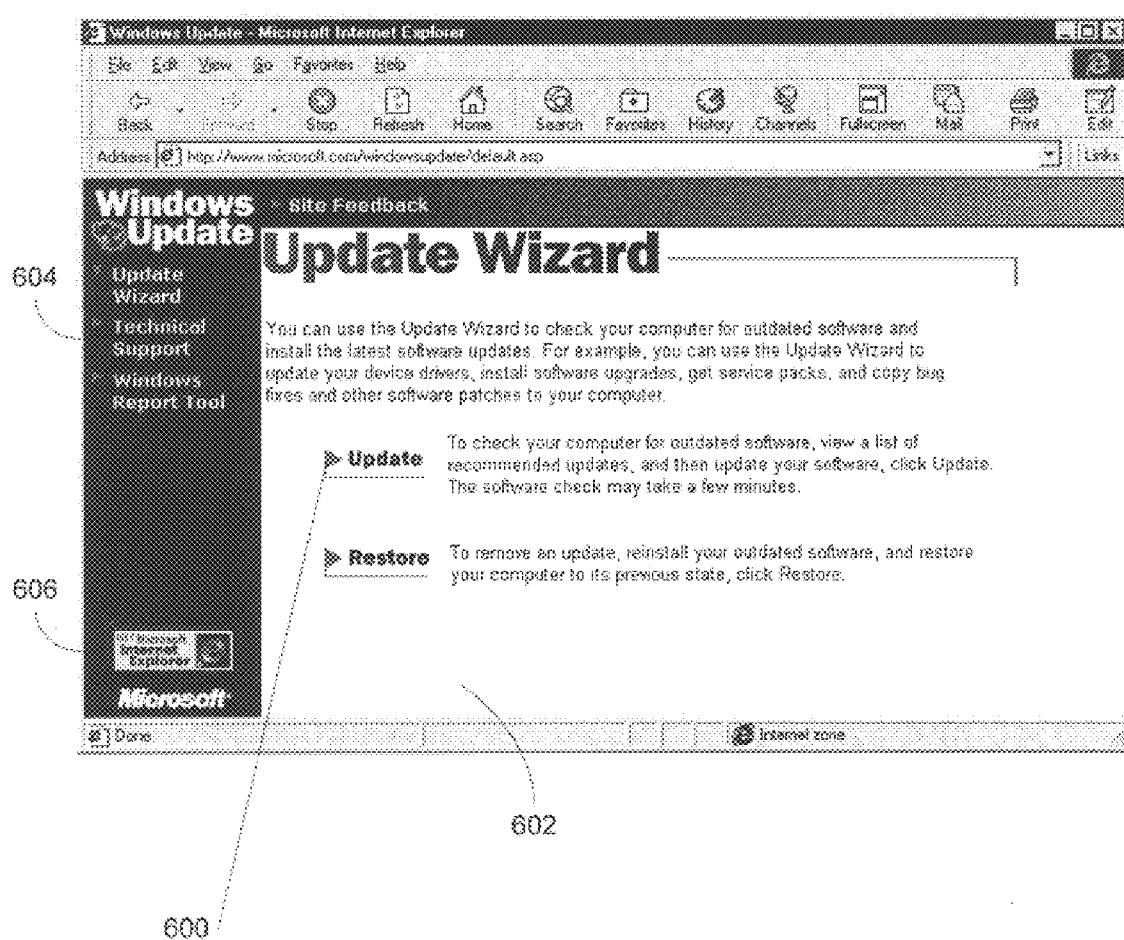
FIGS. 6A–6G show a preferred implementation of the user interface for the upgrade procedure of FIG. 5.

FIG. 6A shows the initial screen shown to a user that has either elected to check for upgrades, or that is receiving a "pushed" (FIG. 7) update. In the embodiment shown, the upgrade process has been incorporated into an upgrade "wizard." This wizard has been incorporated into a browser for easier viewing by a user. (This browser may be integrated with the operating system.) Shown are the main information page 602 along with other related topics 604 and features or links 606 to be shown to the user.

Figure 6B:
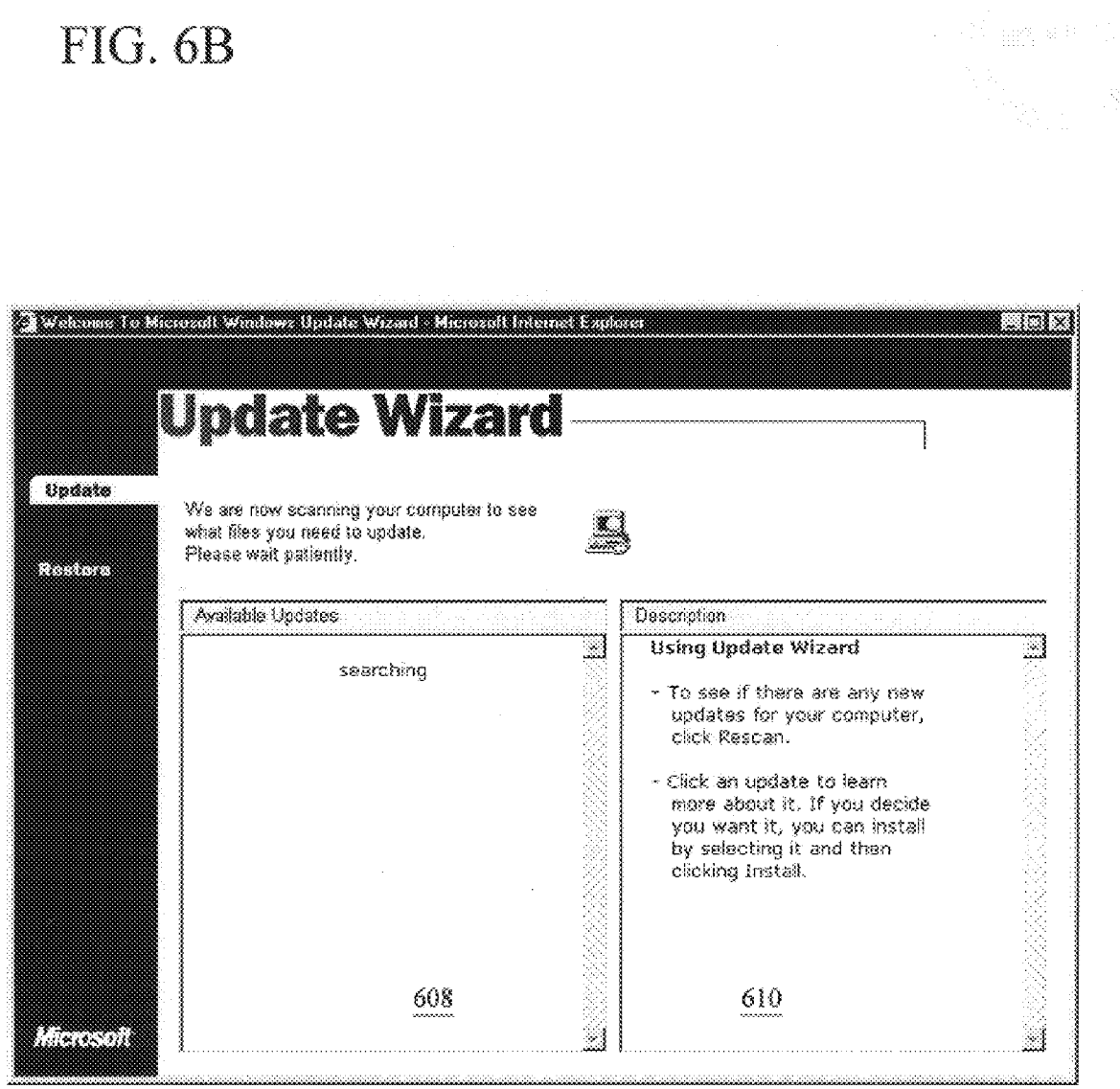

If the user presses the Update 600 link, the user is brought to FIG. 6B. Shown are two main information panels 608, 610. The left panel 608 contains status information for the user, which at this stage just indicates that the upgrade system is performing its search to determine if there are any update candidates. The right panel 610 shows more detailed information about the contents of items in the left panel 608.

Figure 6C:
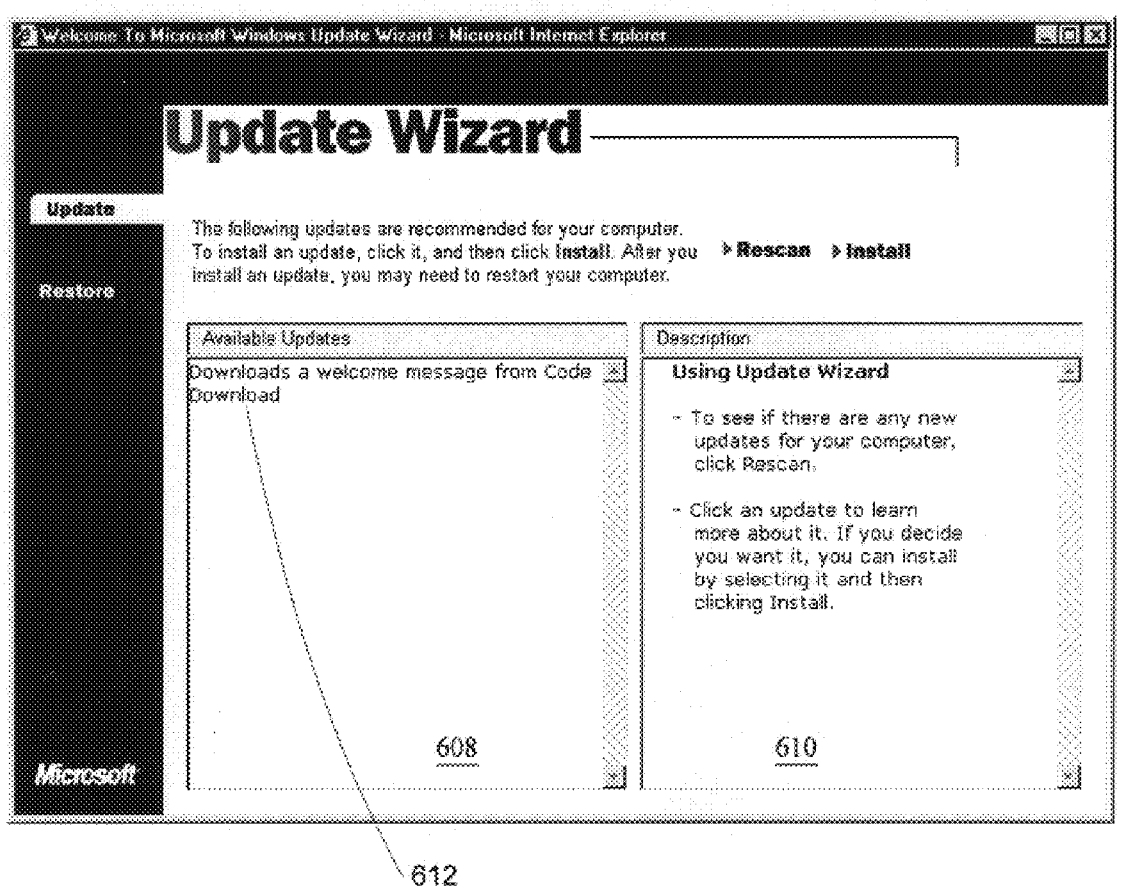

When the search completes, the viewer sees FIG. 6C. Now the left panel 608 shows updates that have been determined available to the user. For this particular user, the only available update is a welcome message file 612.

Figure 6D:
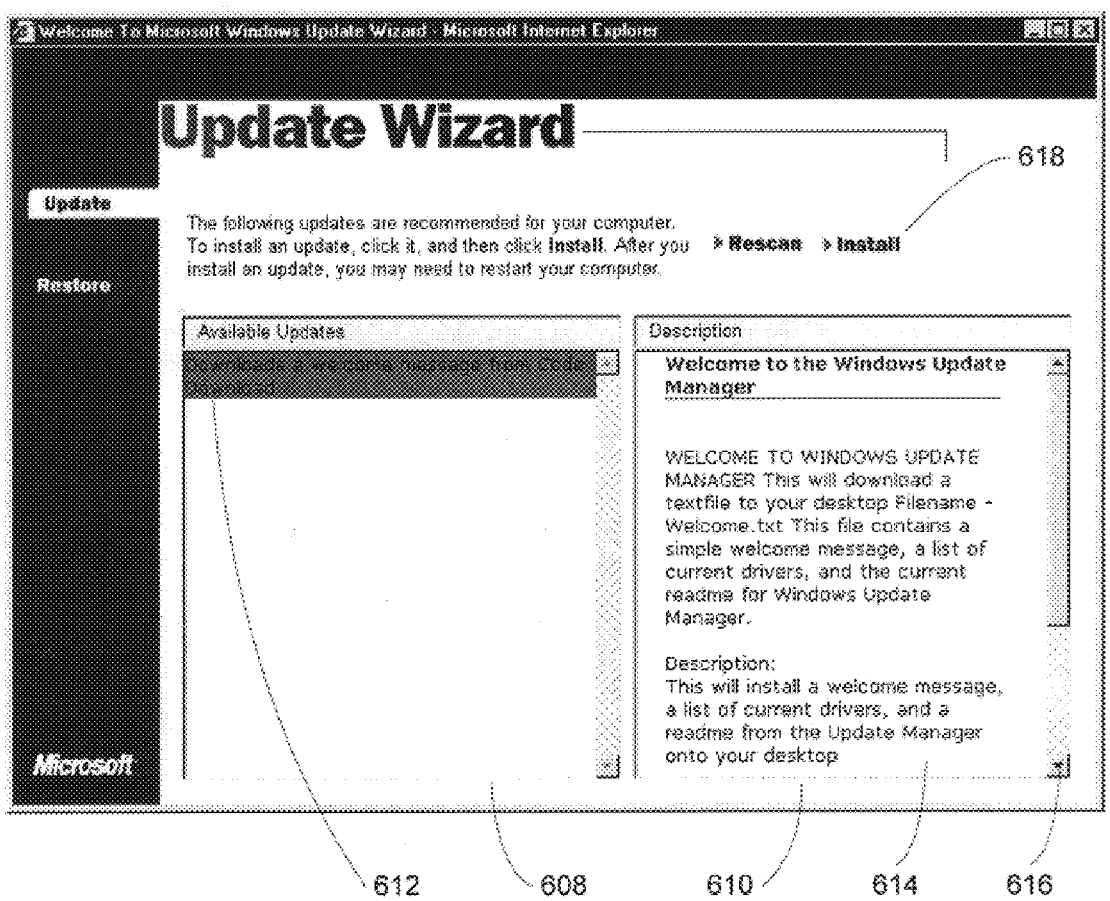

Selecting this upgrade brings the user to FIG. 6D. Now right panel 610 shows detailed information 614 regarding the selected upgrade. As necessary, the right panel 610 provides a scroll bar 616 to allow viewing description data too large to be displayed within the panel. In a preferred embodiment, the detailed information 614 is dynamically downloaded from the server when a user selects an option in the left panel 608. As shown, the welcome message file includes a text file, a read-me file, and a list of current drivers.

Figure 6E:
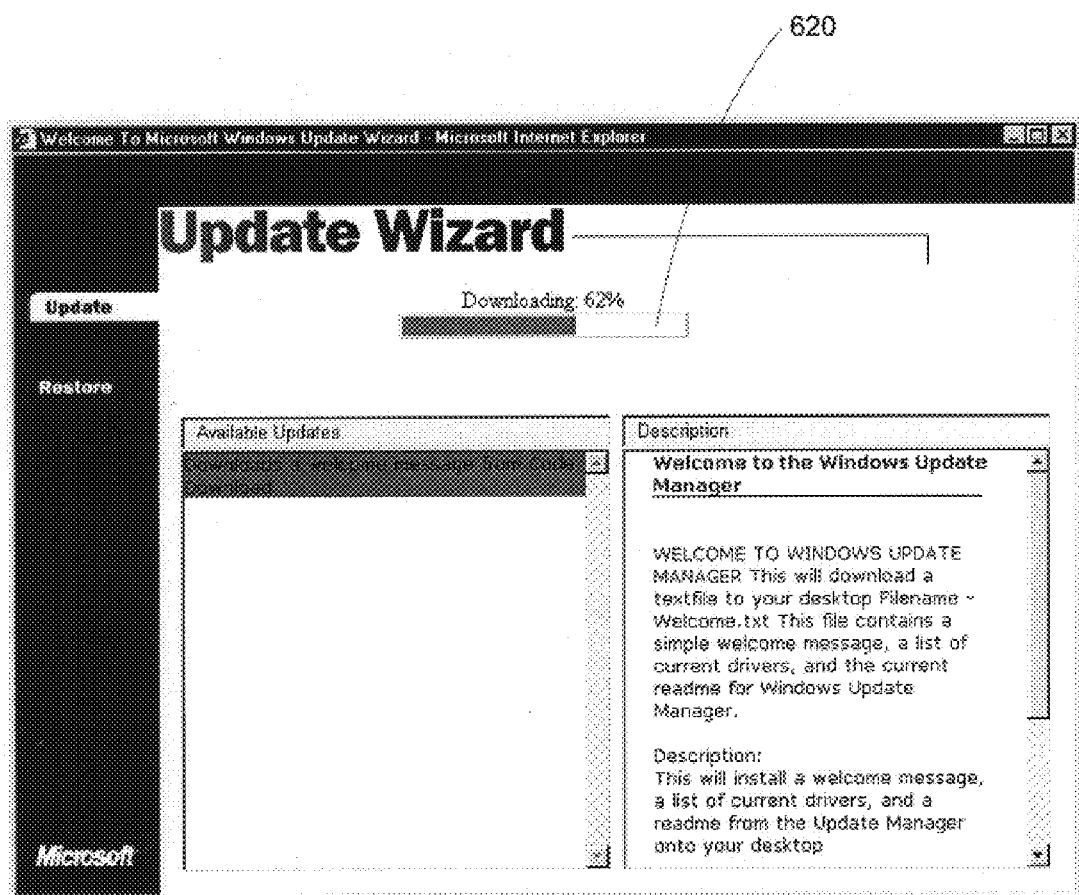
Figure 6F:
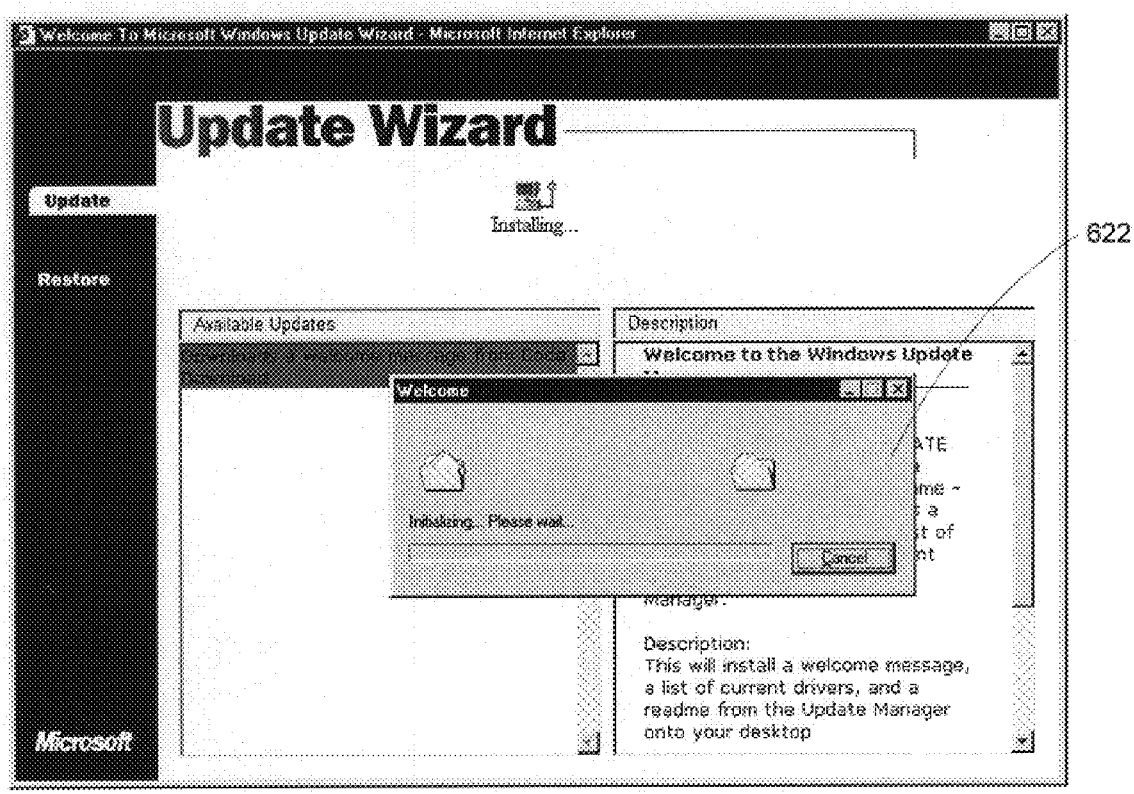
Figure 6G:
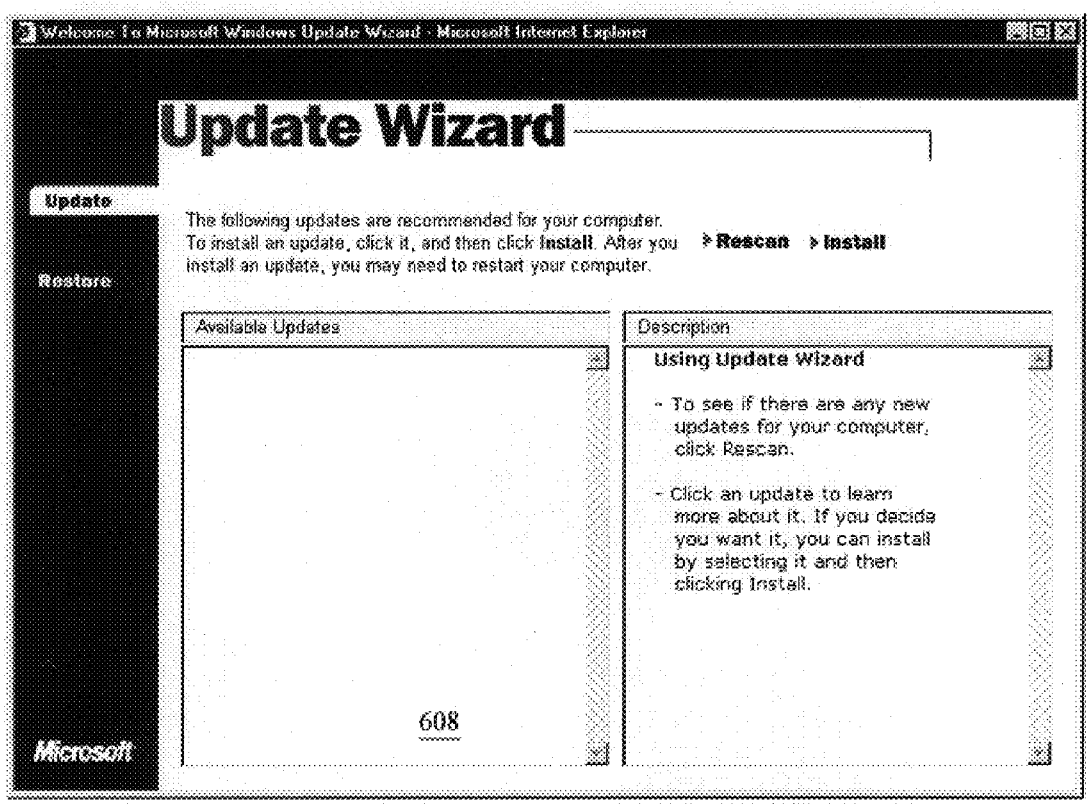

If the user then selects Install 618, the user sees FIG. 6E. Shown is a status meter 620 indicating the percentage of completion for downloading the upgrade data. After the data has been retrieved from the server, the user sees FIG. 6F, which shows the processing 622 of the upgrade from the data just downloaded from the server. After processing is completed, FIG. 6G is displayed to the user. Here the left panel 608 is empty, indicating that there are no more upgrades presently available to the user.

Figure 7:
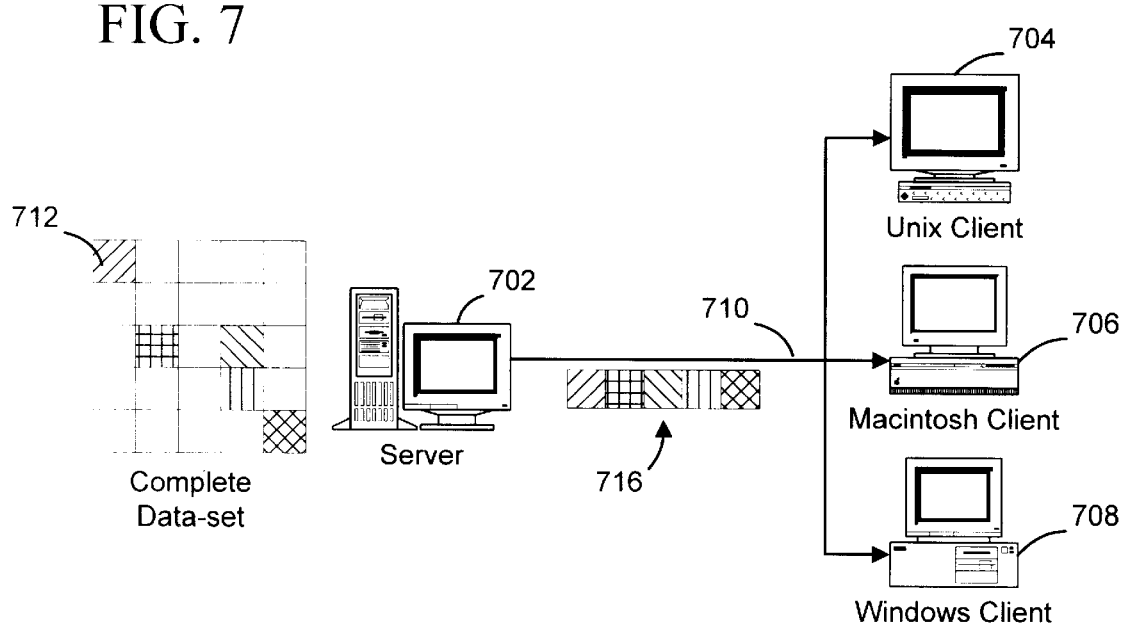
FIG. 7 is a flow-chart showing a push-type implementation of the invention.

FIG. 7 is a flow-chart showing a push-type implementation of the invention. Push technologies automate information delivery and allow conservation of network bandwidth by not requiring the overhead inherent to user interfaces (e.g. browsers), and conservation of human resources by making the updates entirely automatic.

Shown in FIG. 7 are a push server 702 and three clients 704, 706, 708, in communication with the server over a network 710. In a preferred embodiment, the client 704, 706, 708, operating system (e.g. Windows, Macintosh, or Unix) is irrelevant to the operation of the claimed embodiments as any architecture may be updated as described herein. However, for the purposes of this description, it is assumed the client is a Microsoft Windows based machine 708.

Typically, in a non-push environment, the client will not receive updates until the client initiates the update procedure. In a push environment, the system "pushes" updates from the server 702 to the client computer 708 without the client having to take initial action. Pushing updates may be implemented with technology similar to that used in Microsoft Corporation's Webcasting software, or similar technology from other vendors.

The illustrated embodiment supports true push technology, in which the server asynchronously contacts the client over a network connection, as well as "smart pull" technology, in which the client contacts the server to indicate a transitory network link in effect, thereby triggering a push event from the server. For example, a modem or router creates transitory network links.

In the push environment, in addition to other push activities the server may be involved with, the server 702 periodically contacts the client computer 708 to initiate an upgrade check. A push environment allows a server to automatically initiate the steps of FIGS. 2 and 5, where the initial step 200 of FIG. 2 is replaced with contact by the server. As discussed in conjunction with these figures, the server causes the client to receive the compressed bitmap, to decompress it, and then determine what client data may require updating. The bitmap indicates which files (or other data) in a given set of such data have been updated. For example, shown in FIG. 7 are five data files 712 having updates (indicated by cells with a hatch pattern) out of a complete data-set. Assuming client 708 determines all five files are required to update the client's local configuration, just those updated files 716 are transmitted to the client.

Products such as Microsoft Internet Explorer 4 (IE4) provide extensible information delivery architectures to support true push technology, and therefore may be used to implement claimed embodiments. IE4 allows definition of a user interface, scheduling engine, and framework into which new transport protocols and delivery mechanisms may be implemented. Thus, the IE4 software may form the basis of the upgrade process. This technology may be seamlessly integrated into the client operating system so that the client automatically receives updates without running additional programs or taking other action beyond confirming updates as appropriate.

Content for a operating system upgrade may also be published using the standard Channel Definition Format (CDF). In this configuration, the upgrade is performed through operation of a standard web browser interface supporting CDF, instead of through use of proprietary software or proprietary embedded objects in an HTML page. As with client selection of receiving other pushed data (e.g. news, weather, stock report, etc.), clients may "subscribe" to system upgrades and have them performed automatically or by confirmation. Automatic installation is through use of a definition file associated with the data indicating how the data is to be installed, and this definition file includes the appropriate steps as shown in FIGS. 2 and 5. In a preferred embodiment, the definition file is written as an Open Software Distribution (OSD) file, which is a file format based on the Extensible Markup Language (XML) referenced above. A corresponding CDF file is prepared with a SoftwareUpdate USAGE element in the CHANNEL tag, along with AUTOINSTALL selected in the SOFTPKG tag. A CDF file defines how site content is to be viewed, but contains no content itself. Content can be developed using any industry standard technology supported by the client's interface (e.g. Internet Explorer 4.0: HTML 4.0, Java, ECMAScript (formerly JavaScript), ActiveX controls, VBScript, Active Server Pages, etc.). Through application of CDF files and OSD definitions, a client is able to automatically receive and install operating system updates.

The FIG. 7 embodiment also supports smart pull configurations. A smart pull is a variation of push in which the client must perform some step to make the server aware that the client is once again in communication with the server over the network 710. Smart pulling is required when the client's network connection is transitory, such as when the client 708 is in communication with the server over a dial-up connection, or when the network is removed for some other reason (e.g. security or net compatibility issues). A smart pull is essentially equivalent to the configuration shown in FIG. 2 except that as described above for push technology, the upgrade process may be performed with standard Internet web browsers.

CDF-based software distribution is well understood by those skilled in the art, as illustrated by many publicly available references on the subject. See, e.g., Microsoft Interactive Developer magazine, Cutting Edge, vol. 2, no. 2, p. 12–17 (December 1997); "CDF 101: Creating a Simple Channel," Internet article on developing Channels using the Microsoft Channel technology (http://www.microsoft.com/standards/cdf-f.htm); "Channel Definition Format Specs," Internet article describing suggested modifications to Channel Definition Format (http://www.microsoft.com/ie/press/whitepaper/pushwp.htm); and "Webcasting in Microsoft Internet Explorer 4.0," Internet article on Microsoft's approach to Webcasting (http://www.microsoft.com/msdn/sdk/inetsdk/asetup/default.asp).

FIG. 8 shows C language code fragments for a preferred method of hash encoding identifiers.

The essential functioning of a good hash encoder is to convert input text into a pseudo-random number. In preferred embodiments, this is accomplished with two functions: Rand( ) 800 and Hash( ) 802. A hash encoder is essentially a random number generator that generates different numbers for different input. The goal is to have output as unique as is possible. In a preferred embodiment, the hash value is created by looping 804 through each character in the identifier string. In the FIG. 8 embodiment, it is presumed that the last character is such that it will cause termination of the while loop. For example, in the C programming language, strings are often NULL terminated, and the NULL character may also serve as a FALSE condition to the test performed by the while operation. Although the code fragments shown are in C like code, it is understood that other programming languages may be used with appropriate modifications for different language syntax.

For a given input string, IDstring 804, to the Hash( ) 802 function, a hash value is computed based upon each character in the string IDstring. Hash( ) also takes a second parameter, tablesize 806, that indicates the size of the expected output. If a larger space of results is desired, this may be effected by passing larger tablesize values. The hash value 808 to be returned from the Hash( ) function is initially set to 1. Then, while looping 810 through each character in the source string IDstring 804, the hash value 808 is incremented by a value returned from the Rand( ) 800 function.

The Rand( ) function is a pseudo random number generator. Random number generators are well known in the art. As customary, the generator takes a single seed 812 value, to initialize the generator. The goal of this function is to produce random-seeming output for any given seed value. Shown are r 814, a 816, n 818, and d 820 variables set to magic number values. As is known in the art, such magic numbers are chosen according to expected input properties to the random number generator to produce the desired pseudo-random output sequence. The selection of such magic numbers is well known in the art.

As shown, the pseudo-random value val 822 is computed 824 by taking the seed 812 number modulo n 818, multiplying this result by a, and then subtracting off the quantity seed divided by n multiplied by r. The next step is to check if the resulting val is less than or equal to zero, and if so, to increment val by d. The final result for val is then returned to the Hash( ) 802 function.

Each call to Rand( ) 800 passes as the seed value 812 for Rand( ) the result of adding the current hash value to the current character in the IDstring 804. (Note that preferred embodiments may make use of language-dependent implicit type conversions.) The random number generator result (i.e. val 822) is then added to the previous hash value to create the new hash value. After looping through the entire input string IDstring 804, the final hash value is computed by taking the current hash value 808 modulo tablesize 806.

Having illustrated and described the principles of the present invention in a preferred embodiment, and several variations thereof, it should be apparent to those skilled in the art that these embodiments can be modified in arrangement and detail without departing from such principles. In view of the wide range of embodiments to which the principles of the invention may be applied, it should be recognized that the detailed embodiment is illustrative and should not be taken as limiting the invention. Accordingly, we claim as our invention all such modifications as may come within the scope and spirit of the following claims and equivalents thereto.

What is claimed is:

1. A method for providing updates for program modules from a server computer to a client computer comprising the steps:

(a) determining an identifier code corresponding to each of a plurality of program modules for which updates are available on the server computer;

(b) assembling a bitmap indicating the identifier codes for which corresponding program module updates are available on the server computer;

(c) determining an identifier code corresponding to each of plural program modules stored on the client computer;

(d) from the bitmap, and from the identifier codes determined in step (c), identifying a program module on the client computer for which an update may be available; and (e) transferring an update from the server computer to the client computer;

which includes installing said update on the client computer, said installation including displaying a message to the user advising of the update taking place.

2. The method of claim 1 in which step (a) includes generating a hash code for each of said plurality of program modules for which updates are available on the server computer to indicate availability of the updates, wherein the same hash code may be generated for two different program modules for which updates are available on the server computer.

3. The method of claim 2 which includes determining whether a hash conflict between hash codes for at least two different program modules for which updates are available on the server computer has occurred before transferring the update from the server to the client.

4. The method of claim 3 which includes transferring administrative data relating to a program module for which an update is available from the server computer to the client computer, and checking said data at the client computer to determine whether said update corresponds to a program module on the client computer prior to transferring said update from the server computer.

5. The method of claim 1 which includes transferring said bitmap from the server computer to the client computer, and performing step (d) at the client computer.

6. The method of claim 5 which includes compressing said bitmap prior to transfer to the client computer.

7. The method of claim 1 which includes, between steps (d) and (e):

transferring administrative data from the server computer to the client computer, said administrative data specifying the name of the program module for which the server computer has an update.

8. The method of claim 7 in which the administrative data transferred from the server computer to the client computer further specifies a file by which the automatic transfer and installation of the update on the client computer can be invoked.

9. The method of claim 7 in which the administrative data further includes an override file, said override file affording a program module provider an opportunity to reject an upgrade.

10. The method of claim 1 which includes:

identifying plural program modules on the client computer for which an update is available on the server;

transferring plural updates corresponding to said identified plural program modules, from the server to the client; and installing said plural updates on the client.

11. The method of claim 10 which includes providing a user interface allowing a user to specify which of the plural updates are to be installed on the client.

12. A computer-readable medium having computer-executable instructions for performing on the server computer at least steps (a), (b) and (e) of claim 1.

13. A computer-readable medium having computer-executable instructions for performing on the client computer at least steps (c) and (d) of claim 1.

14. The method of claim 1 further comprising:

transferring an executable override file to the client, wherein the executable override file is designed to selectively reject an upgrade based on configuration of the client.

15. A method for pushing, from a server computer to a client computer, an update relating to a module on the client computer, said update and said client module each having associated therewith a unique identifier and a non-unique identifier, the server having index data indicating unique identifier(s) associated with each non-unique identifier, the method comprising:

configuring the client computer to receive data pushed from the server computer;

transmitting, from the server computer to the client computer, data indicating availability of an update for a module having a certain non-unique identifier, determining, at the client computer, the presence of a module having said certain non-unique identifier;

transmitting at least a portion of said index data from the server computer to the client computer;

at the client computer, determining from said at least a portion of said index data whether the server computer has an update corresponding to said module on the client computer;

transmitting said update from the server computer to the client computer; and installing said update on the client computer, said installation including displaying a message to the user advising of the update taking place.

16. A system for updating software and/or hardware modules on a client computer with plural corresponding updates on a server computer, each module and update having a unique identifier associated therewith, the system including:

a communication pathway between the client and the server for transmitting the updates to the client from the server;

first encoding means for encoding unique identifiers for the plural updates on the server into an update map;

second encoding means for encoding a client module unique identifier into a non-unique comparison value;

checking means for checking the non-unique comparison value against the update map to determine a potential update, the potential update corresponding to one of the plural updates on the server;

confirmation means for confirming the potential update, wherein confirmation includes comparing the unique identifier of the potential update with the unique identifier of the client module; and installation means for installing said confirmed potential update on the client computer, said installation means operable to cause display of a message to the user advising that an update is taking place.

17. A system for determining availability of updates to a hardware or software device, each device having associated therewith a unique identifier, and each unique identifier having associated therewith a non-unique encoded value, the encoded value being a member of a set of possible encoding values, the system comprising:

a client in communication with a server over a low-bandwidth link;

a first database stored on the server and copied to the client over the low-bandwidth link, the first database containing an entry for each element of the set of possible encoding values, each entry having a flag set high if an update is available for at least one unique identifier associated with the entry; and a second database stored on the client, the second database containing entries corresponding to each device on the client that may be upgraded;

wherein the client determines potential availability of an update for a client device by comparing, over the low-bandwidth link, entries of the second database to the first database.

18. The system of claim 17 wherein the first database is transferred to the client in the form of a bitmap.

19. The system of claim 17 further comprising:

a file by which the automatic transfer and installation of an update on the client can be invoked.

20. A computer readable medium having stored thereon a program for causing a client computer to:

receive from a server computer a bit field, where a bit entry is set to a first value to indicate a potentially corresponding program module update on the server, or to a second value otherwise;

encode a unique identifier for at least one local program module into a non-unique bit field index;

compare the non-unique bit field index to the corresponding bit field entry, and if such entry is set to the first value, to receive from the server a detailed file containing unique identifiers for all update program modules on the server sharing the non-unique bit field index; and search the unique identifiers within the detailed file for a match with the unique identifier for the at least one local program module.

21. A computer-readable medium having computer-executable instructions for performing the method recited in claim 20.

22. A method of determining software update availability for a client computer by sending software update availability information over a communications pathway, the method comprising:

with a hashing function, hashing unique identifiers of available software updates to non-unique identifiers to generate a data structure inconclusively indicating the availability of at least one software update;

sending the data structure over the communications pathway during a first transmission;

after the first transmission, comparing the data structure to a list of upgrade candidates for the client computer to determine an update may be available for an upgrade candidate in the list, wherein the update is identified by a non-unique identifier associated with the update via the hash function;

responsive to affirmatively determining an update may be available, during a second transmission over the communications pathway, sending a list of entries for a plurality of software updates associated with the non-unique identifier via the hash function;

consulting the entries to conclusively determine if a software update is available for the upgrade candidate;

over the communications pathway, before sending the software update available for the upgrade candidate, sending an executable override file for the software update available for the upgrade candidate; and before sending the software update available for the upgrade candidate, executing the override file to determine whether to reject the software update based on configuration of the client computer.

* * * * *

UNITED STATES PATENT AND TRADEMARK OFFICE
CERTIFICATE OF CORRECTION

PATENT NO. : 6,151,708
DATED : November 21, 2000
INVENTOR(S) : Pedrizetti et al.

Page 1 of 2

It is certified that error appears in the above-identified patent and that said Letters Patent is hereby corrected as shown below:

Title page,
"SUB-OPTICAL" should read -- SUB-OPTIMAL --.

Inventors, "Redmond" should read -- Camano --.

OTHER PUBLICATIONS, Wuytack et al. reference, "Tranforming" should read Transforming --.

OTHER PUBLICATIONS, Franklin et al. reference, Tranactional client server cache consistency: alternative" should read -- Transactional client server cache consistency: alternatives --.

OTHER PUBLICATIONS, Iftode et al. reference, "Share" should read -- Shared --.

Column 1,
Line 3, "SUB-OPTICAL" should read -- SUB-OPTIMAL --.

Column 12,
Lines 4-25, claim 1 should read:
-- 1. A method for providing updates for program modules from a server computer to a client computer comprising the steps:
(a) determining an identifier code corresponding to each of a plurality of program modules for which updates are available on the server computer;
(b) assembling a bitmap indicating the identifier codes for which corresponding program module updates are available on the server computer;
(c) determining an identifier code corresponding to each of plural program modules stored on the client computer;
(d) from the bitmap, and from the identifier codes determined in step (c), identifying a program module on the client computer for which an update may be available; and

UNITED STATES PATENT AND TRADEMARK OFFICE
CERTIFICATE OF CORRECTION

PATENT NO. : 6,151,708
DATED : November 21, 2000
INVENTOR(S) : Pedrizetti et al.

It is certified that error appears in the above-identified patent and that said Letters Patent is hereby corrected as shown below:

(e) -transferring an update from the server computer to the client computer; which includes installing said update on the client computer, said installation including displaying a message to the user advising of the update taking place. --

Signed and Sealed this

Twenty-second Day of January, 2002

Attest:

Attesting Officer

JAMES E. ROGAN
Director of the United States Patent and Trademark Office